Patented Apr. 15, 1947

2,419,158

UNITED STATES PATENT OFFICE 2,419,158

PRODUCTION OF VANILLIC ACID (SILVER OXIDE PROCESS)

Irwin A. Pearl, Appleton, Wis., assignor, by mesne assignments, to Sulphite Products Corporation, Appleton, Wis., a corporation of Wisconsin No Drawing. Application January 12, 1944, Serial No. 517,985

8 Claims. (Cl. 260—521)

The present invention relates to the production of vanillic and closely related acids, and to an improved process for producing acids derived by oxidation from vanillin, ortho-vanillin, and syringaldehyde.

Most aldehydes may be transformed to the corresponding acids by common oxidizing agents or in the Cannizzaro reaction, but vanillin, ortho-vanillin, and syringaldehyde are exceptions and have been reported as not amenable to either reaction. Ordinary oxidizing agents either (1) have no action on the compound or (2) act as dehydrogenating agents, and yield the dehydro-dicompound or (3) cause complete decomposition.

The Cannizzaro reaction is conveniently written as follows:

$$2RCHO + NaOH \xrightarrow{NaOH} RCH_2OH + RCOONa \quad (1)$$

The symbol "NaOH" written above the arrow in the forgoing equation is the common and convenient way of indicating the presence of the excess alkali called for in the following example, which excess does not enter into the reaction, but maintains the alkalinity needed to cause the reaction to proceed to completion.

It will be seen that one molecule of aldehyde is reduced and the other one oxidized to generate equal parts of the derived alcohol and the sodium salt of the derived acid, which equal parts can be readily separated. I have discovered that vanillin can be quantitatively and easily transformed to vanillic acid by treating it with silver oxide in hot solution with excess alkali.

An example according to the invention is as follows:

Example I

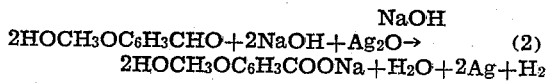
$$2HOCH_3OC_6H_3CHO + 2NaOH + Ag_2O \xrightarrow{NaOH} \quad (2)$$
$$2HOCH_3OC_6H_3COONa + H_2O + 2Ag + H_2$$

About 340 parts of silver nitrate dissolved in about 1000 parts of water is first mixed with about 85 parts of sodium hydroxide dissolved in about 200 parts of water. The precipitated silver oxide is filtered and washed with water. The moist oxide is then covered with about 2500 parts of water and with vigorous agitation is treated successively with about 400 parts of solid sodium hydroxide and about 304 parts of vanillin. The warm reaction mixture is heated for several minutes and then filtered. Pure silver is obtained as the precipitate. The filtrate is acidified with sulfur dioxide. The vanillic acid which separates is filtered and washed with a little cold water. About 300 parts of vanillic acid melting at 210–211° is obtained.

Ortho vanillin and syringaldehyde react in the same way as the vanillin in Example I, with similarly high yields of completely transformed material.

If the treatment with solid sodium hydroxide warms the solution materially above 50° C., the vanillin reacts as fast as it is added and the temperature rises, but full completion of the action is assured by slight further heating. I have secured good results with final temperatures of 75° to 85°, but higher temperatures are innocuous.

However, if the materials are admixed at temperatures materially below 50° C., it is first necessary to warm them, and at about 50° C. the action commences abruptly and the temperature rises.

The silver precipitate, whether formed all at once by warming a previously cool mixture past the temperature of inception, or by the addition of the vanillin to the warm mixture, is a greyish white granular material, but the granules are extremely porous and reticulated, as evidenced by the fact that 5 cubic cm. of the tightly packed dry material weigh only 4.5 to 4.9 grams.

Example II

Gold oxide may be substituted for the silver oxide of Example I. The evolution of heat is somewhat less, so that more external heat must be applied to complete the reaction, and one-third mol of gold sesquioxide is needed to process one mol of vanillin.

Ortho-vanillin and syringaldehyde react in the same way as the ordinary, or para, vanillin in all the reactions above set forth.

Without further elaboration, the foregoing will so fully explain my invention that others may readily adapt the same for use under various conditions of service by applying knowledge current either now or at the time of such future adaptation.

I claim:

1. The method of preparing vanillic acid from vanillin which comprises subjecting two mols of vanillin in aqueous solution with excess alkali to reaction with two mols of alkali and one mol of finely divided silver oxide whereby two mols of the sodium salt of vanillic acid are formed.

2. The process of producing vanillic acid from vanillin which comprises: preparing freshly precipitated silver oxide by chemical precipitation in aqueous solution; treating the silver oxide in water at a temperature higher than about 50° C.

and with vigorous agitation, with sodium hydroxide and vanillin; separating precipitated silver; acidifying the filtrate and separating precipitated vanillic acid.

3. The process of producing ortho-vanillic acid from ortho-vanillin which comprises: reacting silver oxide in water with an alkali hydroxide and with ortho-vanillin; separating precipitated silver; acidifying the filtrate with sulfur dioxide; and separating precipitated ortho-vanillic acid.

4. In the process of effecting substantially quantitative transformation of vanillin to vanillic acid: the step of reacting one mole of vanillin in aqueous solution at a temperature above about 50° C., with ½ mole of silver oxide and one mole of caustic alkali in the presence of excess caustic alkali to produce one mole of the alkali metal salt of vanillic acid.

5. The process of producing vanillic acid from vanillin, which comprises reacting silver oxide in water with an alkali hydroxide and vanillin.

6. The process of producing the derived monocarboxylic acid from an aromatic aldehyde selected from the class consisting of vanillin, ortho-vanillin and syringaldehyde, which comprises: subjecting two mols of the aldehyde in aqueous solution with excess alkali to reaction with two mols of alkali and one mol of finely divided silver oxide whereby two mols of the sodium salt of the derived monocarboxylic acid are formed.

7. The process of producing the derived monocarboxylic acid from an aromatic aldehyde selected from the class consisting of vanillin, ortho-vanillin and syringaldehyde which comprises: preparing freshly precipitated silver oxide by chemical precipitation in aqueous solution; treating the silver oxide in water at a temperature higher than about 50° C. and with vigorous agitation, with sodium hydroxide and the aldehyde; separating precipitated silver; acidifying the filtrate and separating the precipitated monocarboxylic acid.

8. The process of producing the derived monocarboxylic acid from an aromatic aldehyde selected from the class consisting of vanillin, ortho-vanillin and syringaldehyde which comprises: reacting silver oxide in water with alkali hydroxide and the aldehyde; separating precipitated silver; acidifying the filtrate with sulfur dioxide; and separating the precipitated monocarboxylic acid.

IRWIN A. PEARL.

REFERENCES CITED

The following references are of record in the file of this patent:

Tiemann, Ber. Deut. Chem., vol. 8 (1875), page 1123.

Ciamican et al., Ber. Deut. Chem., vol. 38 (1905), page 3821.

Pyle et al., Jour. Amer. Chem. Soc., vol. 61 (1939), pages 2198 to 2203.

Ber. Deut. Chem., vol. 15 (1882), page 1830.

Hale, "Synthetic Use of Metals," (1914), page 41.